United States Patent
Chigurupati et al.

(10) Patent No.: US 10,091,692 B2
(45) Date of Patent: Oct. 2, 2018

(54) PRESERVING MOBILE NETWORK SESSION DATA DURING RADIO ACCESS TECHNOLOGY HANDOVER

(71) Applicant: Juniper Networks, Inc., Sunnyvale, CA (US)

(72) Inventors: Prasad Chigurupati, Bangalore (IN); Venkatesh Badakere, Bangalore (IN); Sarvesh K. Batta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 119 days.

(21) Appl. No.: 15/182,143

(22) Filed: Jun. 14, 2016

(65) Prior Publication Data

US 2017/0359758 A1  Dec. 14, 2017

(51) Int. Cl.
*H04W 36/00* (2009.01)
*H04W 36/18* (2009.01)
*H04M 15/00* (2006.01)
*H04W 88/16* (2009.01)
*H04W 36/14* (2009.01)
*H04W 28/02* (2009.01)

(52) U.S. Cl.
CPC ....... *H04W 36/0022* (2013.01); *H04M 15/66* (2013.01); *H04W 36/14* (2013.01); *H04W 36/18* (2013.01); *H04W 28/0273* (2013.01); *H04W 88/16* (2013.01)

(58) Field of Classification Search
None
See application file for complete search history.

(56) References Cited

U.S. PATENT DOCUMENTS 7,990,993 B1   8/2011 Ghosh et al.
8,605,655 B1  12/2013 Sahai et al.
(Continued)

FOREIGN PATENT DOCUMENTS

EP        3021616 A2    5/2016
WO     2011/000414 A1   1/2011

OTHER PUBLICATIONS

MX Services Control Gateway (Diameter, Gx Router Driver), Juniper Networks, Inc., Jun. 23, 2015, Chapter 2 pp. 11-15.*

(Continued)

*Primary Examiner* — Charles C Jiang
*Assistant Examiner* — George Calvin Atkins, Jr.
(74) *Attorney, Agent, or Firm* — Shumaker & Sieffert, P.A.

(57) ABSTRACT

An example gateway device determines that a first policy, applicable to a subscriber device when the subscriber device is coupled to a first access network, indicates that packets from the subscriber device are to be sent to a service device, and forwards a first set of packets from the subscriber device to the service device while the subscriber device is coupled to the first access network. After determining that the subscriber device has become coupled to a second access network of the plurality of access networks, the gateway device determines that a second policy, for the subscriber device when the subscriber device is coupled to the second access network, does not indicate that packets should be sent to the service device, but nevertheless forwards a second set of packets from the subscriber device to the service device while the subscriber device is coupled to the second access network.

18 Claims, 4 Drawing Sheets

(56) References Cited

U.S. PATENT DOCUMENTS

| | | |
|---|---|---|
| 8,635,326 B1 | 1/2014 | Chaganti et al. |
| 2011/0310906 A1* | 12/2011 | Stenfelt .................. H04L 12/14 370/401 |
| 2014/0092899 A1* | 4/2014 | Krishna .............. H04L 61/2517 370/389 |
| 2015/0092551 A1 | 4/2015 | Moisand et al. |
| 2015/0334595 A1* | 11/2015 | Bosch .................... H04L 29/06 370/235 |
| 2017/0290074 A1* | 10/2017 | Lee .................... H04L 61/6022 |

OTHER PUBLICATIONS

3GPP TS 23.203 V13.1.0, 3rd Generation Partnership Project; Technical Specification Group Services and System Aspects; Policy and charging control architecture (Release 13), http://www.3gpp.org, Sep. 2014, 223 pgs.

3GPP TS 29.212 V13.5.0; 3rd Generation Partnership Project; Technical Specification Group Core Network and Terminals; Policy and Charging Control (PCC); Reference points (Release 13), http://www.3gpp.org, Mar. 2016, 257 pgs.

MX Services Control Gateway (Diameter, Gx Router Driver), Juniper Networks, Inc., modified Jun. 23, 2015, 84 pgs.

Extended Search Report from counterpart European Application No. 17176060.6, dated Dec. 21, 2017, 8 pp.

Antipolis, "Refining PCRF Interfaces for Inter Access System Mobility," ETRI, S2-052412, 3GPP TSG SA WG2 Architecture—S2#48, Sep. 5-9, 2005, 8 pp.

Response to Extended Search Report dated Dec. 21, 2017, from counterpart European Application No. 17176060.6, filed Jul. 19, 2018, 22 pp.

\* cited by examiner

US 10,091,692 B2

PRESERVING MOBILE NETWORK SESSION DATA DURING RADIO ACCESS TECHNOLOGY HANDOVER

TECHNICAL FIELD

This disclosure relates to access networks and policy control for mobile devices.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile access networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile access network, or "mobile network," includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs.

SUMMARY

In general, this disclosure describes techniques related to preserving network session data for mobile devices during radio access technology (RAT) handover in environment that provide services to subscriber data sessions, e.g., in network service virtualized environments that provide services at subscriber-level or even application-level granularity. For example, a subscriber device may initially be coupled to a gateway device via a first type of access network (e.g., a 3G cellular network), for which a policy dictates that traffic for that subscriber is to be forwarded to a device that performs a network service, such as a transmission control protocol (TCP) optimizer service. Subsequently, the subscriber device may be relocate so as to be coupled to the gateway device via a second type of access network (e.g., a 4G cellular network), having different policies that do not require traffic to be forwarded to the device that performs the TCP optimizer service. Nevertheless, to avoid network session interruptions and as described herein, the gateway device may be configured to operate according to an enhanced policy specifying that packets received from the subscriber device for existing network sessions are to be forwarded to the device that performs the TCP optimizer service while packets for any new sessions are to be controlled by the policies of the new access network.

In one example, a method is performed by a gateway device for a plurality of access networks. The gateway device provides access to a packet data network. The method includes determining that a first policy, applicable to a subscriber device when the subscriber device is coupled to a first access network of the plurality of access networks, indicates that packets from the subscriber device are to be sent to a service device. The method also includes forwarding a first set of packets of a network session from the subscriber device to the service device according to the first policy while the subscriber device is coupled to the first access network. The method further includes, in response to determining that the subscriber device has become coupled to a second access network of the plurality of access networks, the second access network being different than the first access network, determining that a second policy, applicable to the subscriber device when the subscriber device is coupled to the second access network, does not indicate that packets are to be sent to the service device. The method also includes forwarding a second set of packets of the network session from the subscriber device to the service device while the subscriber device is coupled to the second access network. In this manner, the gateway device continues to forward the second set of packets to the service device, despite the second policy indicating that the packets of the network session need not be forwarded to the service device.

In another example, a gateway device for a plurality of access networks provides access to a packet data network. The gateway device includes one or more network interfaces configured to send and receive packets via the access networks and to send and receive packets via the packet data network, and one or more hardware-based processing units. The processing units are configured to determine that a first policy, applicable to a subscriber device when the subscriber device is coupled to a first access network of the plurality of access networks, indicates that packets from the subscriber device are to be sent to a service device, forward, via the one or more network interfaces, a first set of packets of a network session from the subscriber device to the service device according to the first policy while the subscriber device is coupled to the first access network, in response to determining that the subscriber device has become coupled to a second access network of the plurality of access networks, the second access network being different than the first access network, determine that a second policy, applicable to the subscriber device when the subscriber device is coupled to the second access network, does not indicate that packets are to be sent to the service device, and forward a second set of packets of the network session from the subscriber device to the service device while the subscriber device is coupled to the second access network.

In another example, a computer-readable storage medium has stored thereon instructions that, when executed, cause a processor of gateway device for a plurality of access networks and that provides access to a packet data network to determine that a first policy, applicable to a subscriber device when the subscriber device is coupled to a first access network of the plurality of access networks, indicates that packets from the subscriber device are to be sent to a service device, forward a first set of packets of a network session from the subscriber device to the service device according to the first policy while the subscriber device is coupled to the first access network, in response to determining that the subscriber device has become coupled to a second access network of the plurality of access networks, the second access network being different than the first access network, determine that a second policy, applicable to the subscriber device when the subscriber device is coupled to the second access network, does not indicate that packets are to be sent to the service device, and forward a second set of packets of the network session from the subscriber device to the service device while the subscriber device is coupled to the second access network.

The details of one or more examples are set forth in the accompanying drawings and the description below. Other features, objects, and advantages will be apparent from the description and drawings, and from the claims.

DETAILED DESCRIPTION

Figure 1:
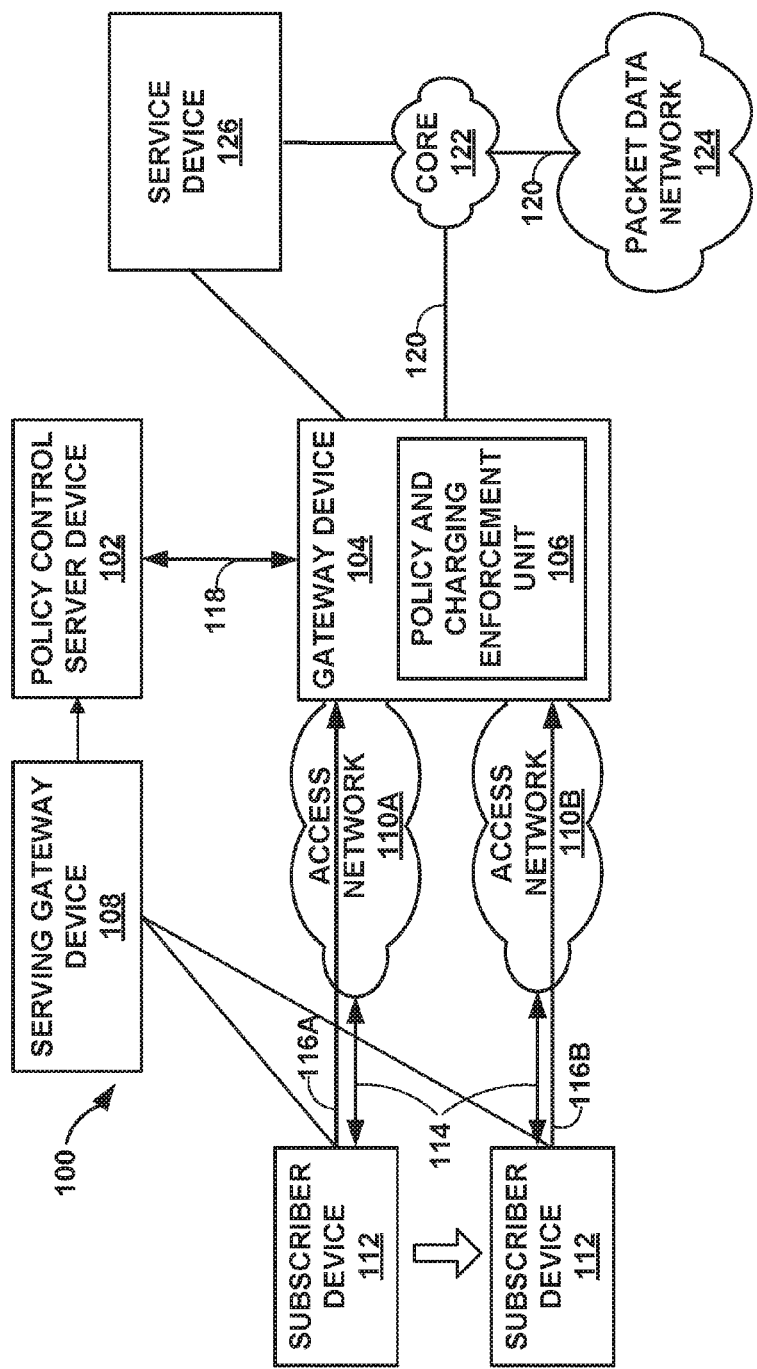
FIG. 1 is a block diagram illustrating an example network system that may improve data processing when a mobile subscriber device switches between access networks according to techniques described in this disclosure.

FIG. 1 is a block diagram illustrating an example network system 100 that may improve data processing when a mobile subscriber device switches between access networks according to techniques described in this disclosure. Network system 100 includes packet data network (PDN) 124 coupled to service provider access networks 110A, 110B ("access networks 110") via access network gateway device 8 ("gateway device 104") for access networks 110. Packet data network 124 supports one or more packet-based services that are available for request and use by subscriber device 112. As examples, PDN 124 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 124 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access networks 110, an enterprise IP network, or some combination thereof. In various embodiments, PDN 124 is connected to a public WAN, the Internet, or to other networks. Packet data network 124 executes one or more packet data protocols (PDPs), such as IP (IPv4 and/or IPv6), X.25 or Point-to-Point Protocol (PPP), to enable packet-based transport of PDN 124 services.

In some examples, gateway device 104 is a services gateway device or services node upstream from a separate access gateway device (not illustrated in FIG. 1) and logically situated on interface 120 between access networks 110 and PDN 124. In some examples, gateway device 104 and a separate access gateway may be different components within a computing device, such as a router. In some examples, the gateway device 104 is a services gateway that determines services to apply to packet flows in accordance with policies received from policy control server device 102. In such examples, the gateway device 104 may direct the packet flows to a services complex along a service chain (not shown in FIG. 1) for application of the determined services for the packet flows. Further example details of a gateway device are described in U.S. Pat. No. 8,635,326, entitled "MOBILE GATEWAY HAVING REDUCED FORWARDING STATE FOR ANCHORING MOBILE SUBSCRIBERS," the entire contents of which are incorporated herein by reference.

Subscriber device 112 connects to gateway device 104 via access networks 110 to receive connectivity to subscriber services for applications hosted by subscriber device 112. Applications hosted by subscriber device 112 may include VoIP clients, video games, videoconferencing, E-mail, and Internet browsers, among others. Subscriber device 112 may represent, for example, a mobile phone, a smart phone, a laptop computer or tablet, a wearable computing device such as a smart watch or smart glasses, a gaming console, a wireless device, a network-ready appliance, or another device with which to access services provided by PDN 124 over one or more access networks 110. A subscriber may represent, for instance, an enterprise, a residential subscriber, or a mobile subscriber. Subscriber device 112 connects to access networks 110 via access links 114 that comprise wired and/or wireless communication link. The term "communication link," as used herein, comprises any form of transport medium, wired or wireless, and can include intermediate nodes such as network devices. Each of access links 114 may comprise, for instance, aspects of an asymmetric DSL network, WiMAX, a T-1 line, an Integrated Service Digital Network (ISDN), wired Ethernet, or a cellular radio link.

As explained in greater detail below, gateway device 104 includes policy and charging enforcement unit 106. In general, policy and charging enforcement unit 106 analyzes packet flows associated with subscriber device 112 to determine when subscriber device 112 starts and/or ends the applications discussed above to access the various services discussed above. In response to detection of such an application start or end, gateway device 104 sends messages to policy control server device 102, e.g., for purposes of properly charging a subscriber associated with subscriber device 112 for access to corresponding services or for downloading policies related to the detected application. Such messages may be in accordance with Diameter protocol, which is described in Calhoun et al., "Diameter Base Protocol," Network Working Group, RFC 3588, September 2003, available at tools.ietf.org/html/rfc3588, and in Fajardo et al., "Diameter Base Protocol," Internet Engineering Task Force (IETF), RFC 6733, October 2012, available at tools.ietf.org/html/rfc6733. Credit control in Diameter is described in Hakala et al., "Diameter Credit-Control Application," Internet Engineering Task Force, RFC 4006, August, 2005, available at tools.ietf.org/html/rfc4006. The Gx protocol is described in 3rd Generation Partnership Project; Technical Specification Group Core Network and Terminals; Policy and Charging Control (PCC); Reference points, 3GPP S 29.212 v. 13.2.0 (Rel. 13) June 2015, available at www.3gpp.org/DynaReport/29212.htm.

A network service provider operates, or in some cases leases, elements of access networks 110 to provide packet transport between subscriber device 112 and gateway device 104. Access networks 110 represent networks that aggregate data traffic from one or more subscribers for transport to/from core network 122 (illustrated as "core 122" in FIG. 1) of the service provider. Access networks 110 include network nodes (not shown) that execute communication protocols to transport control and user data to facilitate communication between subscriber device 112 and gateway device 104. Access networks 110 may include a broadband access network, cellular access network, a wireless LAN, a public switched telephone network (PSTN), or other type of access network. Examples of cellular access networks include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum. Accordingly, in some examples, access networks 110 represent cellular access networks conforming to different network standards. For example, access network 110A may represent a 3G network, and access network 110B may represent a 4G network.

Service provider core network 122 (hereinafter, "core network 122") offers packet-based connectivity to subscriber device 112 attached to access network 110A (and later attached to access network 110B) for accessing PDN 124. Core network 122 may represent a public network that is owned and operated by a service provider to interconnect a plurality of networks, which may include access networks 110. Core network 122 may implement Multi-Protocol Label Switching (MPLS) forwarding and in such instances may be referred to as an MPLS network or MPLS backbone. In some instances, core network 122 represents a plurality of interconnected autonomous systems, such as the Internet, that offers services from one or more service providers. PDN 124 may represent an edge network coupled to core network 122, e.g., by a customer edge device such as customer edge switch or router. PDN 124 may include a data center.

In examples of network system 100 that include cellular access networks such as access networks 110, gateway device 104 may represent a mobile gateway, for example, a Gateway General Packet Radio Service (GPRS) Serving Node (GGSN), an Access Gateway (aGW), and/or a Packet Data Network (PDN) Gateway (PGW). In examples of network system 100 that include a wireline/broadband access network, gateway device 104 may represent a Broadband Services Router (BSR), Broadband Network Gateway (BNG), business provider edge (PE) router, and/or a Broadband Remote Access Server (BRAS), for instance. Interface 120 may represent a Gi and/or SGi interface (or "reference point"). Consequently, elements of core network 122 may in some cases be referred to as an SGi-LAN and/or Gi-LAN. In some instances, gateway device 104 represents a Traffic Detection Function (TDF) device and policy and charging enforcement unit 106 represents the TDF. Either gateway device 104 or a separate TDF device that includes the policy and charging enforcement unit 106 may be referred to as a "policy enforcement device."

A network service provider that administers at least parts of network system 100 offers services to subscribers associated with devices, e.g., subscriber device 112, that access the service provider network. Services offered may include, for example, traditional Internet access, Voice-over-Internet Protocol (VoIP), video and multimedia services, and security services. As described above with respect to access networks 110, core network 122 may support multiple types of access network infrastructures that connect to service provider network access gateways to provide access to the offered services.

In this example, gateway device 104 is a network device that implements policy and charging control (PCC) functionality for access networks 110. Policy control server device 102 provisions gateway device 104 by policy interface 118 with one or more policy rules that each specifies a set of information enabling the detection of a service data flow and defining policy control, charging, or application detection parameters for application by network elements of access networks 110. Policy control server device 102 may represent a network device that provides a Policy Control and Charging Rules Function (PCRF) for a mobile (e.g., 3GPP) or convergent instance of access networks 110 or, alternatively or in addition, a network device that provides a Policy Decision Point (PDP) for a Broadband Policy Control Framework (BPCF) framework for a broadband/wireline instance of access networks 110. Further example details of a gateway device and a policy control server that implement policy charging and enforcement operations are described in U.S. Pat. No. 8,605,655, entitled "POLICY AND CHARGING CONTROL RULE PRECEDENCE MAPPING IN WIRELESS CONTENT ACCESS NETWORKS," the entire contents of which are incorporated herein by reference.

Gateway device 104 may generally be configured to perform the techniques of this disclosure. In one example implementation, application detection and control (ADC) is performed by gateway device 104 over a Gx interface and Sd interface (generally corresponding to interface 118). The ADC functionality allows gateway device 104 to notify policy control server device 102 of detected applications in subscriber traffic (e.g., sets of packet flows 116A and 116B). That is, packet flows 116A represent one or more packet flows associated with subscriber device 112A, while packet flows 116B represent one or more packet flows associated with subscriber device 112M. In response, policy control server device 102 can provision new policies to gateway device 104 (which may represent a packet gateway (PGW) or TDF gateway) to control those applications.

In many situations, subscriber devices such as subscriber device 112 may move between different geographic locations, and therefore, become coupled to different access networks while accessing core network 122 and packet data network 124. FIG. 1 illustrates an example in which subscriber device 112 is initially coupled to access network 110A, and is subsequently coupled to access network 110B. Access networks 110A, 110B may represent different types of access networks with different capabilities. For example, access network 110A may represent a 3G cellular network, and access network 110B may represent a 4G cellular network. As additional examples, either of access networks 110 may represent a local wireless (e.g., "WiFi") access network, e.g., a wireless LAN, accessed by subscriber device 112 via a wireless interface using any of the IEEE 802.11 communication protocols. For example, in the example of FIG. 1, subscriber device may move between two different cellular radio access networks, between two different wireless LAN networks, between a wireless LAN network and a radio access network, and the like.

In this example, subscriber device 112 initially establish network access and sends packets of packet flow 116A to gateway device 104 via access network 110A. Packet flow 116A represents a flow of packets associated with a particular network session, and subscriber device 112 may initiate one or more network sessions. After subscriber device 112 is authenticated and becomes coupled to access network 110B, subscriber device 112 may later physically relocate so as to send packets of packet flow 116B (which represents the same packet flow as packet flow 116A, but labeled differently to represent that these packets traverse access network 110B) to gateway device 104. More particularly, subscriber device 112 sends packets of packet flows 116A, 116B to a device (not shown) coupled to packet data network 124 via gateway device 104.

Policy and charging enforcement unit 106 of gateway device 104 enforces service flow-based policy and charging control according to the policy rules. Policy and charging enforcement unit 106 represents a device, module, component, software library, or combination of the above that applies policy enforcement for access networks 110 in accordance with the policy rules provided by policy control server device 102. Policy and charging enforcement unit 106 may in some instances be executed by a device separate from gateway device 104.

As noted above, gateway device 104 determines policies associated with packet flows, subscriber devices, and access networks 110. In particular, policy control server device 102 sends data representing policies to gateway device 104. Accordingly, gateway device 104 may initially receive packets of packet flow 116A from subscriber device 112 via access network 110A. In the example discussed above, access network 110A represents a 3G cellular network. Thus, policy control server device 102 may determine that packets of packet flow 116A are to be sent to a device or service complex that performs one or more network services, service chains or virtualized network functions (VNFs) on the packet flow. Example services include HTTP filtering, firewall services, deep packet inspections and the like. In the example of FIG. 1, gateway device 104 determines that packets for packet flow 116A are to be sent to a transmission control protocol (TCP) optimizer service, such as service device 126, based on packet flow 116A traversing a 3G cellular network. However, policy control server device 102 may determine that packets received via access network 110B need not be sent to service device 126, e.g., a device that performs the TCP optimizer service, because such a service is unnecessary for a 4G cellular network. Further example details of a gateway device steering traffic to a service device or service complex for application of network services are described in U.S. patent application Ser. No. 14/042,685, entitled "SESSION-AWARE SERVICE CHAINING WITHIN COMPUTER NETWORKS," the entire contents of which are incorporated herein by reference.

In general, when subscriber device 112 moves from access network 110A to 110B, policy control server device 102, accordingly, sends data representing a new policy for subscriber device 112 to gateway device 104. However, based on an enhanced policy definition described herein, rather than applying the new policy to packets of packet flow 116B, in accordance with the techniques of this disclosure, gateway device 104 continues to forward packets of pre-existing packet flow 116B to service device 126 for continuous application of any prior services to that packet flow, while handling any new packet flows from subscriber 112 according to services specified in the new policy for access network 110B. This prevents the network session associated with packet flow 116B from being terminated, interrupted or otherwise adversely impacted, which would likely otherwise happen upon enforcing the new policy.

In particular, and in accordance with the techniques described herein, policy control server device 102 defines the new policy to specify data indicating whether existing forwarding chains (i.e., forwarding information) within gateway 104 for existing network sessions should continue to be applied when enforcing the new policy. In one example, the data corresponds to an attribute value pair (AVP) specified in steering information of the new policy. For example, the data may correspond to a keep-existing-steering AVP syntax element of the new policy so as to indicate that existing forwarding information installed within forwarding hardware of gateway device 104 is to be used when forwarding packets for existing packet flows for the subscriber, such as packet flow 116.

In this manner, for packets received from subscriber device 112 of existing network sessions of subscriber device 112 following the transition from access network 110A to access network 110B, gateway device 104 determines whether to continue to forward the packets according to existing "steering information" (that is, data that indicates how such packets are to be forwarded, e.g., to service devices), or to update the forwarding information for the packets according to the new policy. In any case, for packets of new sessions established after the transition to access network 110B, gateway device 104 applies the new policy. That is, gateway device 104 forwards packets of the new sessions according to forwarding information (or steering information) of the new policy corresponding to access network 110B. In this manner, the techniques of this disclosure avoid interruptions to existing network sessions when a subscriber device transitions between different types of access networks associated with policies having different steering information.

Subscriber device 112 may establish subscriber sessions and begin sending subscriber data traffic toward core network 122 in order to access and receive services provided by PDN 124, and such packets traverse gateway device 104 as part of at least one packet flow. A subscriber session may represent an IP Connectivity Access Network (IP-CAN) session. Packet flows 116A, 116B illustrated in FIG. 1 represent one or more upstream packet flows from respective subscriber device 112 and directed to PDN 124. The term "packet flow," "traffic flow," or simply "flow" refers to a set of packets originating from a particular source device and sent to a particular destination device as part of a communication session between the source and destination device. A flow of packets, in either the upstream (sourced by subscriber device 112) or downstream (destined for subscriber device 112) direction, may be identified by the 5-tuple: <source network address, destination network address, source port, destination port, protocol>. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Figure 2:
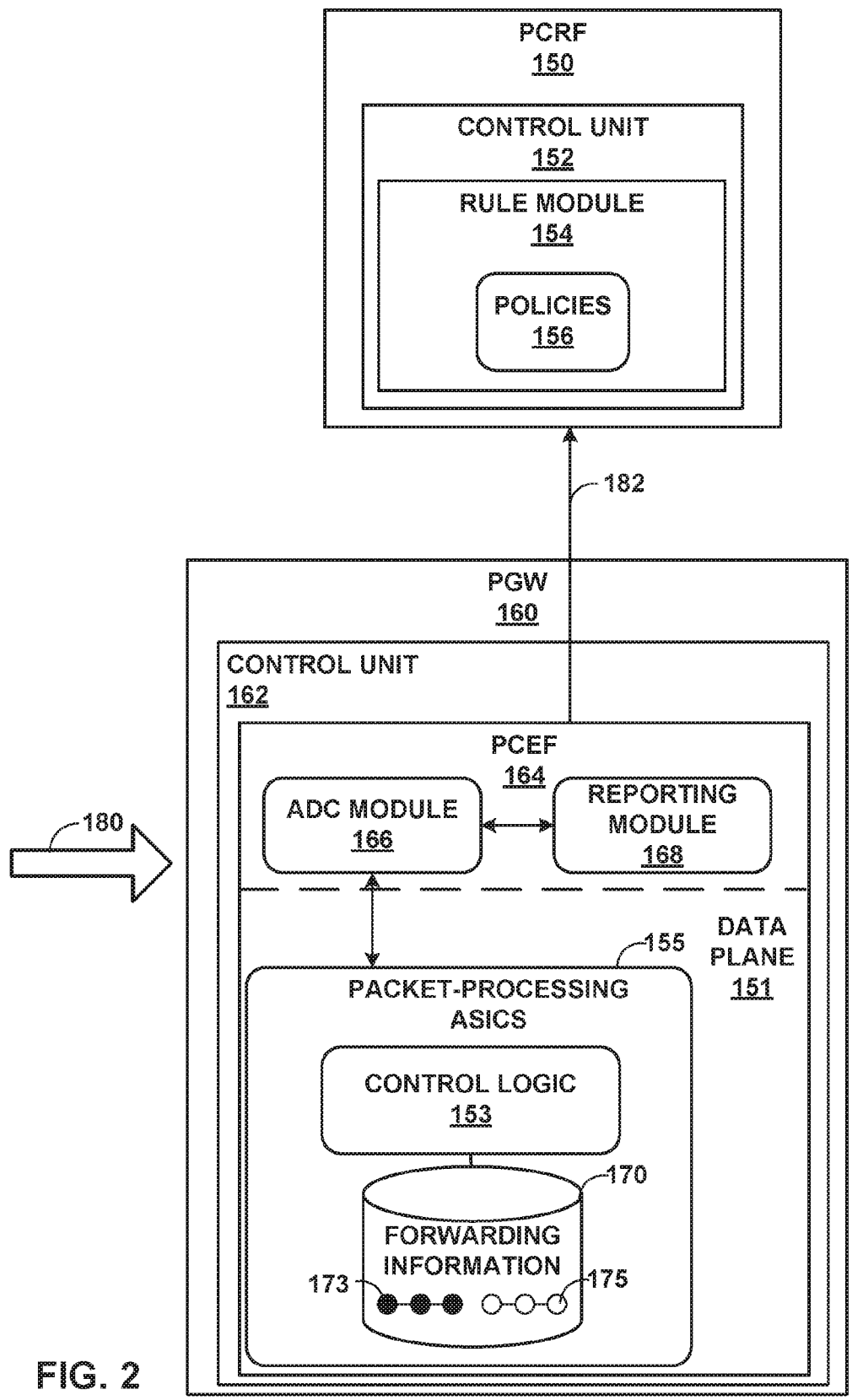
FIG. 2 is a block diagram illustrating example instances of a PCRF and a packet gateway (PGW).

FIG. 2 is a block diagram illustrating example instances of a PCRF 150 ("PCRF 150") and a packet gateway (PGW) 160. In general, PCRF 150 may correspond to a policy and charging rules function executed by policy control server device 102 (FIG. 1). Likewise, PGW 160 may correspond to gateway device 104 (FIG. 1). In this example, PGW 160 executes PCEF 164, which may correspond to a policy and charging enforcement function executed by gateway device 104. It should be understood that FIG. 2 merely illustrates one example, and that other gateway devices (such as, for example, a TDF gateway) may execute PCEF 164.

PCRF 150 and PGW 160 are, in this example, separate network devices that include respective control units 152 and 162. Each of control units 152 and 162 may include one or more processors or controllers (not shown in FIG. 2) that execute software instructions, such as those used to define a software or computer program, stored to a tangible computer-readable medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control units 152 and 162 may each comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware. PCRF 150 and PGW 160 also each include one or more network interface cards (not shown) or other network interfaces with which to exchange control traffic and, at least in the case of PGW 160, data traffic in the form of packet flows.

Control unit 162 of PGW 160 provides an operating environment for PCEF 164 (an example instance of policy and charging enforcement unit 106 of FIG. 1) to apply policy and charging control (PCC) rules received from PCRF 150 in PCC rule installation messages to perform bearer binding, charging, reporting, credit management, and event triggering. In addition, PCEF 164 performs techniques of this disclosure for detection of application starts and/or terminations in packet flows 180 (which may generally correspond to packet flows 116 of FIG. 1).

PCEF 164 includes Application Detection and Control (ADC) module 166, reporting module 168, and a data plane 151 having packet-processing ASICs 155 in which control logic 153 processes subscriber packets in accordance with forwarding information 170. As noted above, PGW 160 receives packet flows 180 from corresponding subscriber devices (e.g., subscriber devices 112 of FIG. 1). In this example, PCEF 164 executes ADC module 166 to detect an application associated with each of packet flows 180. After ADC module 166 determines an application associated with a packet flow (and a corresponding subscriber device), reporting module 168 may generate a message in accordance with Diameter protocol to be sent to PCRF 150, such as message 182. For example, the message may be a CCR-U message.

ADC module 166 in this example also maintains forwarding information 170, which specify forwarding operations based on the policies provided by PCRF 150 and topology/routing information for the network. In the example of FIG. 2, ASICs 155 of data plane 151 are programmed with forwarding information 170 and process the packets according to defined forwarding structures within the forwarding information to direct the packets to services and/or destinations for the packets. Forwarding information 170 generally indicates a device to which packets of a packet flow are to be forwarded (also referred to as a "next hop" for the packets). For example, forwarding information 170 maps packet key information (e.g., destination information and other select information from a packet header) to one or more specific next hops and ultimately to one or more specific output interfaces of interface cards of the network device. In addition, forwarding information 170 may specify specific forwarding operations to be applied on to the particular packets. Control unit 162, PCEF 164, and/or ADC module 166 manipulate forwarding information 170 within data plane 151 for packet flows based on policy information received from PCRF 150 and topology/routing information for the network. Some of policies 156 may indicate that traffic is to be forwarded to a device that performs a particular service (e.g., service device 126 of FIG. 1), while other policies 156 may indicate that traffic is simply to be forwarded to a next hop along a route to reach an ultimate destination for the traffic. For example, one or more of policies 156 may indicate that traffic originating from a device on a 3G cellular network is to be forwarded to a device performing a TCP optimizer service, whereas other ones of policies 156 may indicate that traffic originating from a device on a 4G cellular network service is not to be sent to the device performing the TCP optimizer service.

In accordance with the techniques described herein, policies 156 may indicate whether or not traffic of existing sessions is to be forwarded according to existing forwarding operations and next hop information within information 170 even when that forwarding information may be inconsistent with a new policy being deployed for a given subscriber. For example, when deploying a new policy, such as when a subscriber device migrates to a new access network, PCRF 150 may include in the message a "keep-existing-steering" syntax element along with other policy information provided to PCEF 164 when reporting module 168 reports that a device has moved to a new access network. If the value of the "keep-existing-steering" syntax element indicates that existing steering information is to be maintained, ADC module 166 may maintain existing forwarding information 170 for the network session, even if the policy otherwise indicates that the forwarding information to be applied to network sessions originating from a corresponding subscriber device is to be different than that for previous network sessions. As such, in this state, ASICs 155 may be configured by ADC module 166 to apply existing forwarding operations 173 of forwarding information 170 to packet flows of existing sessions for the subscriber and also to apply newly installed forwarding operations 175 to packets for new sessions originated by the after the relocation to the new access network, e.g., to direct the packets for the new sessions to different services as specified by the new/updated policies for the new access network while maintaining uninterrupted service for sessions that existed for the subscriber prior to the relocation. Additional example details of forwarding information, including chained forwarding operations for processing packets within packet-processing integrated circuits, are described in U.S. Pat. No. 7,990,993, entitled "PLATFORM-INDEPENDENT CONTROL PLANE AND LOWER-LEVEL DERIVATION OF FORWARDING STRUCTURES," incorporated herein by reference.

In this manner, a subscriber device, such as subscriber device 112 (FIG. 1), may originally use access network 110A (FIG. 1) to access packet data network 124 (FIG. 1). At this time, ADC module 166 of PCEF 164 may determine that subscriber device 112 is communicating via access network 110A. Thus, reporting module 168 may report that subscriber device 112 is coupled to access network 110A to PCRF. Rule module 154 may determine, from policies 156, that a policy indicates that traffic originating from a subscriber device coupled to access network 110A is to be forwarded to a device performing, e.g., a TCP optimizer service (or some other service in addition or in the alternative, such as a security service). PCRF 150 may send instructions to PCEF 164 to cause PCEF 164 to configure forwarding information 170 to cause traffic received from subscriber device 112 to be forwarded to the device performing the TCP optimizer service.

Subsequently, subscriber device 112 may move to a different geographical location, at which access network 110B is available. In response, ADC module 166 determines that subscriber device 112 has become coupled to access network 110B. Reporting module 168 then reports this move of subscriber device 112 to PCRF 150. Rule module 154 may again determine, from policies 156, that a different one of policies 156 indicates that traffic originating from a subscriber device coupled to access network 110B is not to be forwarded to the device performing the TCP optimizer service. However, this policy may further indicate that existing forwarding information (e.g., existing forwarding chains) is to be maintained. Thus, PCRF 150 sends instructions to PCEF 164 to keep existing forwarding information for existing network sessions, but to use the new forwarding for new network sessions. In response, ADC module 166 maintains existing forwarding information for existing network sessions in forwarding information 170, but when subscriber device 112 initiates a new network session, ADC module 166 configures forwarding information 170 to avoid forwarding traffic of the new network session to the device performing the TCP optimizer service.

In this manner, PGW 160 may forward packets of different, simultaneous packet flows of different network sessions from subscriber device 112 to different next hops, based on the one of access networks 110 to which subscriber device 112 was coupled when the network sessions were initiated. The packet flows may be "simultaneous" in that the network sessions for the packet flows may be ongoing concurrently. For example, subscriber device 112 may send packets of a first network session, then a second network session, then the first network session again.

In this manner, this disclosure provides techniques that may avoid premature network session termination, which may otherwise result in dropping (and therefore retransmission) of packets. For example, if PCEF 164 were to immediately apply new forwarding information to packets of an existing network session, the packets may be delivered out of order, which may cause retransmission of the packets or, ultimately, timeout for the network session. By continuing to forward the packets of an existing network session using the same forwarding information, PGW 160 may avoid such early termination of a network session and also avoid delays in reception of the packets. The techniques of this disclosure, such as maintaining existing forwarding information (e.g., existing forwarding chains) for existing network sessions, and moreover, PCRF 150 signaling to PCEF 164 whether or not to keep existing forwarding (e.g., using a "keep-existing-steering" syntax element) for existing network sessions, may be used to achieve these and other advantages.

Figure 3A:
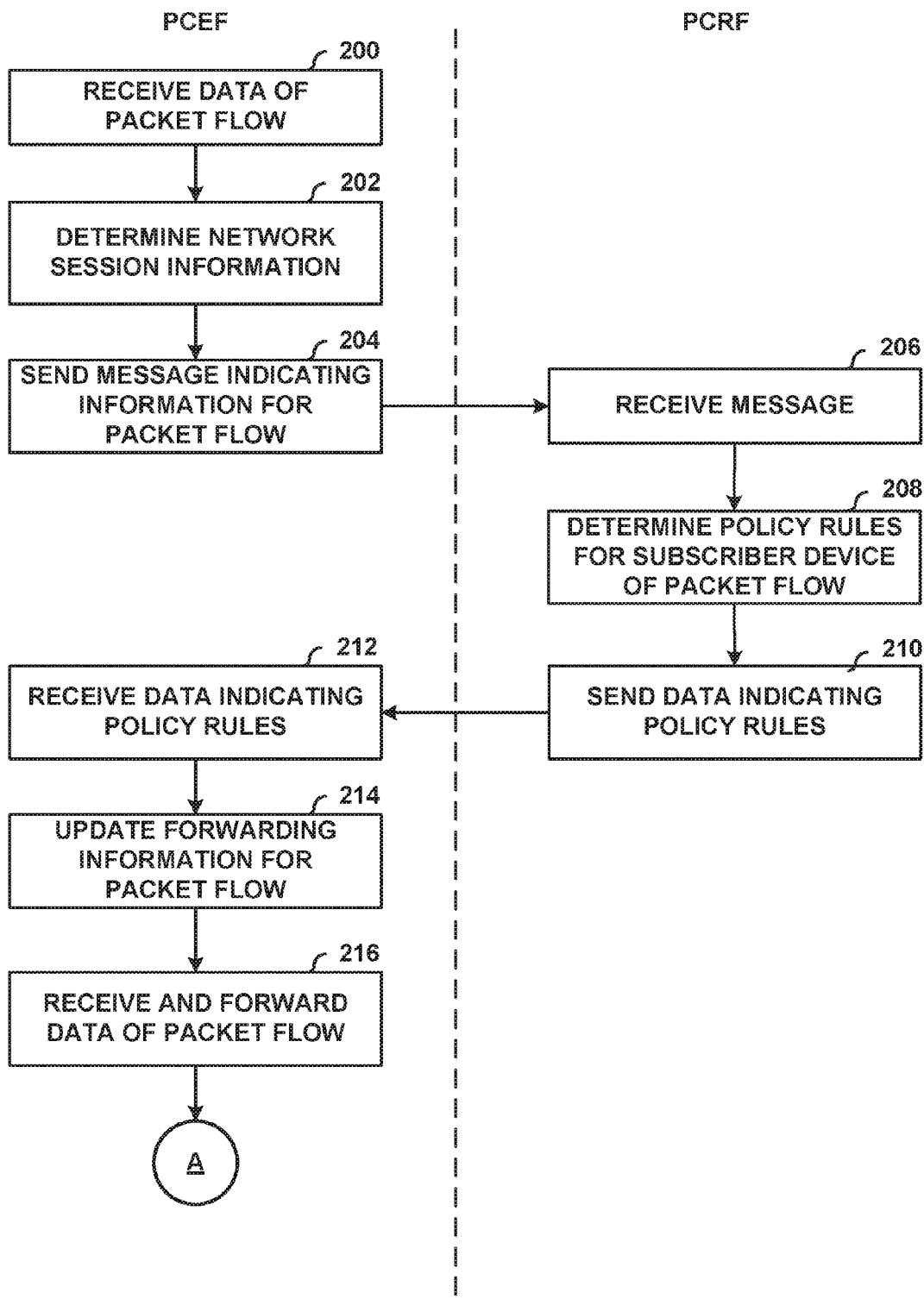
FIGS. 3A and 3B are flowcharts illustrating an example method in accordance with the techniques of this disclosure.
Figure 3B:
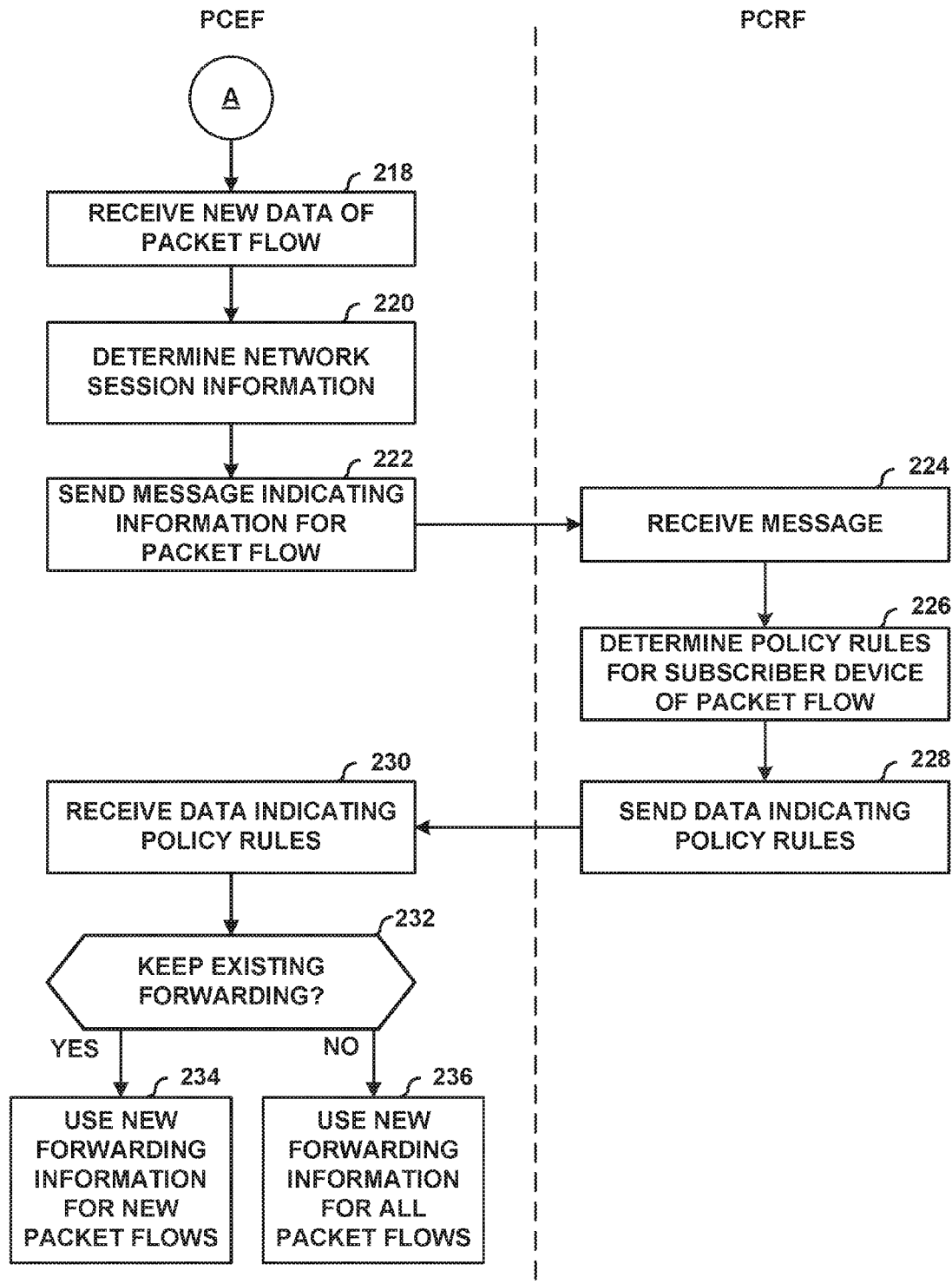

FIGS. 3A and 3B are flowcharts illustrating an example method in accordance with the techniques of this disclosure. For purposes of example and explanation, the method of FIGS. 3A and 3B is described with respect to PCRF 150 and PCEF 164 of FIG. 2. However, it should be understood that other devices may be configured to perform the techniques described with respect to FIGS. 3A and 3B.

In this example, initially, PCEF 164 receives data of a packet flow (200). In particular, PCEF 164 receives the data via a first access network, such as access network 110A. PCEF 164 (e.g., ADC module 166 of FIG. 2) determines network session information associated with the packet flow (202), such as the access network by which the data was received, an identity of a subscriber device that sent the data, and the like. PCEF 164 then sends a message indicating the network information for the packet flow to PCRF 150 (204). In particular, reporting module 168 may send this message to PCRF 150.

PCRF 150 receives the message from PCEF 164 (206), and uses the information of the message to determine policy rules for the subscriber device of the packet flow (208). In particular, rule module 154 (FIG. 2) examines policies 156 (FIG. 2) to determine which of policies 156 applies to the subscriber device, given the network session information received from PCEF 164. For example, policies 156 may include a policy that indicates that for packet flows originating from subscriber devices communicatively coupled to access network 110A (FIG. 1), traffic (i.e., packets) of the packet flows are to be forwarded to a service device that performs a TCP optimizer service (e.g., service device 126 of FIG. 1). Accordingly, PCRF 150 sends data indicating the policy rule (or rules) applicable to the subscriber device to PCEF 164 (210).

PCEF 164 receives the data indicating the policy rule(s) from PCRF 150 (212). Then, PCEF 164 updates forwarding information 170 to enforce the policy rule(s) received from PCRF 150 (214). For example, in the scenario discussed above, PCEF 164 would update forwarding information 170 to indicate that traffic received from the subscriber device is to be forwarded to a device that performs a TCP optimizer service, e.g., service device 126. PCEF 164 then receives and forwards data of the packet flow according to forwarding information 170 (216). Although not expressly shown in FIGS. 3A and 3B, it should be understood that as data is received, PCEF 164 determines whether network information related to the packet flow has changed.

Thus, at a later point in time (as shown in FIG. 3B), PCEF 164 receives new data of the packet flow (218). PCEF 164 again determines the network session information (220), e.g., the identity of the subscriber device from which the data originated, the access network by which the data was received, and the like. In this example, it is assumed that part of the network session information has changed, e.g., the subscriber device has become coupled to access network 110B. Thus, PCEF 164 sends a message indicating the network session information for the packet flow to PCRF 150 (222).

PCRF 150 again receives the message (224), and determines policy rules for the subscriber device of the packet flow (226). In accordance with the techniques of this disclosure, policies 156 may indicate that traffic originating from the subscriber device when coupled to access network 110B is not to be forwarded to service device 126 (FIG. 1). However, policies 156 may further indicate that existing forwarding information (e.g., existing forwarding chains) is to be maintained. For example, policies 156 may include a "keep existing steering" syntax element indicating whether or not existing steering information (that is, forwarding information) is to be maintained for existing packet flows. Thus, PCRF 150 sends data indicating the policy rule(s) for traffic originating from the subscriber device (228), including whether existing forwarding information for existing packet flows is to be maintained.

In one example, PCRF 150 communications in accordance with 3GGP messaging standards and specifies rules by providing Charging-Rule-Install Attribute Value Pairs (AVPs). Each Charging-Rule-Install AVP can contain multiple Charging-Rule-Name AVPs or multiple Charging-Rule-Definition AVPs. In an example implementation, PCRF 150 sends the data specifying whether existing forwarding information is to be maintained as the following example message format, where "Keep-Existing-Steering" represents the indicative data:

Steering-Information::=<AVP Header:1108>
[Service-Chain-Identifier] 1101
[Steering-Uplink-VRF] 1109
[Steering-Downlink-VRF] 1110
[Steering-IP-Address] 1111
[Keep-Existing-Steering] 1112

Further example details of 3GGP charging rule messages are described in "3rd Generation Partnership Project; Technical Specification Group Core Network and Terminals; Policy and Charging Control (PCC); Reference points (Release 13)", 3rd Generation Partnership Project, 2016, the entire contents of which are incorporated herein by reference.

Thus, PCEF 164 receives the data indicating the policy rule(s) from PCRF 150 (230). PCEF 164 also determines whether to keep existing forwarding information based on the received data (232). If the data received from PCRF 150 indicates that existing forwarding information is to be maintained for existing packet flows ("YES" branch of 232), PCEF 164 uses the new forwarding information only for new packet flows originating from the subscriber device, but maintains existing forwarding information for existing packet flows (234). For example, for the existing packet flow, PCEF 164 may continue to direct traffic of the packet flow to service device 126, but avoid forwarding traffic of new packet flows (that is, those packet flows initiated after the subscriber device becomes coupled to access network 110B) to service device 126. On the other hand, if the data received from PCRF 150 does not indicate that existing forwarding information is to be maintained for existing packet flows, PCEF 164 uses the new forwarding information for all packet flows, including existing packet flows (236).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising, by a gateway device for a plurality of access networks and that provides access to a packet data network:
   determining that a first policy, applicable to a subscriber device when the subscriber device is coupled to a first access network of the plurality of access networks, indicates that packets from the subscriber device are to be sent to a service device;
   forwarding a first set of packets of a first network session from the subscriber device to the service device according to the first policy while the subscriber device is coupled to the first access network;
   in response to determining that the subscriber device has become coupled to a second access network of the plurality of access networks, the second access network being different than the first access network:
      determining that a second policy, applicable to the subscriber device when the subscriber device is coupled to the second access network, does not indicate that packets are to be sent to the service device;
      forwarding a second set of packets of the first network session from the subscriber device to the service device according to the first policy while the subscriber device is coupled to the second access network; and
      forwarding a third set of packets of a second network session from the subscriber device according to the second policy when the second network session is established while the subscriber device is coupled to the second access network, wherein forwarding the third set of packets comprises forwarding the third set of packets to a destination of the third set of packets while avoiding forwarding the third set of packets to the service device, according to the second policy.

2. The method of claim 1, wherein forwarding the second set of packets to the service device comprises determining that the second policy indicates that forwarding operations installed within a configurable packet processor of the gateway device for existing network sessions of the subscriber device are to be maintained within the configurable packet processor and applied to subsequent packets for the existing network sessions.

3. The method of claim 2, wherein determining that the second policy indicates that the forwarding operations within the configurable packet processor for existing network sessions of the subscriber are to be maintained comprises determining a value for a syntax element of the second policy representing whether the forwarding chains for existing network sessions are to be maintained.

4. The method of claim 2, wherein determining that the second policy indicates that the forwarding operations within the configurable packet processor for existing network sessions of the subscriber are to be maintained comprises determining a value for a keep-existing-steering syntax element of a set of steering information of the second policy.

5. The method of claim 1, wherein the plurality of access networks includes one or more radio access networks.

6. The method of claim 1, wherein forwarding the second set of packets to the service device comprises determining that the second policy includes a keep-existing-steering attribute value pair (AVP) syntax element.

7. The method of claim 6, wherein the keep-existing-steering AVP syntax element is included within steering information including a service-chain-identifier AVP, a steering-uplink-VRF AVP, a steering-downlink-VRF, and a steering-IP-address AVP.

8. A gateway device for a plurality of access networks that provides access to a packet data network, the gateway device comprising:
one or more network interfaces configured to send and receive packets via the access networks and to send and receive packets via the packet data network; and
one or more hardware-based processing units configured to:
determine that a first policy, applicable to a subscriber device when the subscriber device is coupled to a first access network of the plurality of access networks, indicates that packets from the subscriber device are to be sent to a service device;
forward, via the one or more network interfaces, a first set of packets of a network session from the subscriber device to the service device according to the first policy while the subscriber device is coupled to the first access network;
in response to determining that the subscriber device has become coupled to a second access network of the plurality of access networks, the second access network being different than the first access network;
determine that a second policy, applicable to the subscriber device when the subscriber device is coupled to the second access network, does not indicate that packets are to be sent to the service device;
forward a second set of packets of the network session from the subscriber device to the service device according to the first policy while the subscriber device is coupled to the second access network; and
forward a third set of packets of a second network session from the subscriber device according to the second policy when the second network session is established while the subscriber device is coupled to the second access network, wherein the processing units are configured to forward the third set of packets to a destination of the third set of packets while avoiding forwarding the third set of packets to the service device, according to the second policy.

9. The gateway device of claim 8, further comprising a configurable packet processor, wherein the one or more processing units are configured to determine that the second policy indicates that forwarding operations installed within the configurable packet processor for existing network sessions of the subscriber device are to be maintained within the configurable packet processor and applied to subsequent packets for the existing network sessions.

10. The gateway device of claim 9, wherein the one or more processing units are configured to determine a value for a syntax element of the second policy representing whether the forwarding operations within the configurable packet processor for existing network sessions of the subscriber are to be maintained comprises determining a value for a syntax element of the second policy representing whether the forwarding chains for existing network sessions are to be maintained.

11. The gateway device of claim 9, wherein the one or more processing units are configured to determine a value for a keep-existing-steering syntax element of a set of steering information of the second policy that represents whether the forwarding operations within the configurable packet processor for existing network sessions of the subscriber are to be maintained.

12. The gateway device of claim 8, wherein the plurality of access networks includes one or more radio access networks.

13. The gateway device of claim 8, wherein to forward the second set of packets to the service device, the one or more processing units are configured to determine that the second policy includes a keep-existing-steering attribute value pair (AVP) syntax element.

14. The gateway device of claim 13, wherein the keep-existing-steering AVP syntax element is included within steering information including a service-chain-identifier AVP, a steering-uplink-VRF AVP, a steering-downlink-VRF, and a steering-IP-address AVP.

15. The gateway device of claim 8, further comprising a service card that includes the service device.

16. A gateway device for a plurality of access networks that provides access to a packet data network and configured to perform a policy and charging reference function (PCRF) for the packet data network, the device comprising:
one or more network interfaces configured to send and receive packets via the access networks and to send and receive packets via the packet data network; and
one or more hardware-based processing units configured to:
determine that a first policy, applicable to a subscriber device when the subscriber device is coupled to a first access network of the plurality of access networks, indicates that packets from the subscriber device are to be sent to a service device;
forward, via the one or more network interfaces, a first set of packets of a network session from the subscriber device to the service device according to the first policy while the subscriber device is coupled to the first access network;
in response to determining that the subscriber device has become coupled to a second access network of the plurality of access networks, the second access network being different than the first access network;

determine that a second policy, applicable to the subscriber device when the subscriber device is coupled to the second access network, does not indicate that packets are to be sent to the service device and includes a syntax element having a value indicating that existing forwarding operations installed within a configurable packet processor of the gateway device are to be maintained within the configurable packet processor and applied to subsequent packets for existing network sessions;

forward a second set of packets of the network session from the subscriber device to the service device while the subscriber device is coupled to the second access network based on the value for the syntax element; and forward a third set of packets of a second network session from the subscriber device according to the second policy when the second network session is established while the subscriber device is coupled to the second access network, wherein the processing units are configured to forward the third set of packets to a destination of the third set of packets while avoiding forwarding the third set of packets to the service device, according to the second policy.

17. The gateway device of claim 16, wherein to forward the second set of packets to the service device, the one or more processing units are configured to determine that the second policy includes a keep-existing-steering attribute value pair (AVP) syntax element.

18. The gateway device of claim 17, wherein the keep-existing-steering AVP syntax element is included within steering information including a service-chain-identifier AVP, a steering-uplink-VRF AVP, a steering-downlink-VRF, and a steering-IP-address AVP.

* * * * *